United States Patent
Jung et al.

(10) Patent No.: US 8,964,585 B2
(45) Date of Patent: Feb. 24, 2015

(54) METHOD AND APPARATUS OF LIMITING MEASUREMENT REPORTS

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 13/522,945

(22) PCT Filed: Jan. 21, 2011

(86) PCT No.: PCT/KR2011/000436
§ 371 (c)(1),
(2), (4) Date: Jul. 18, 2012

(87) PCT Pub. No.: WO2011/090342
PCT Pub. Date: Jul. 28, 2011

(65) Prior Publication Data
US 2012/0300657 A1    Nov. 29, 2012

Related U.S. Application Data

(60) Provisional application No. 61/297,227, filed on Jan. 21, 2010.

(51) Int. Cl.
*G01R 31/08* (2006.01)
*H04W 4/00* (2009.01)
*H04W 36/00* (2009.01)
(Continued)

(52) U.S. Cl.
CPC .......... *H04W 36/0083* (2013.01); *H04W 24/10* (2013.01); *H04L 5/001* (2013.01)

USPC ........................................... 370/252; 370/331

(58) Field of Classification Search
None
See application file for complete search history.

(56) References Cited

U.S. PATENT DOCUMENTS

2008/0214198 A1    9/2008 Chen et al.
(Continued)

FOREIGN PATENT DOCUMENTS

WO    2009/119595    10/2009

*Primary Examiner* — Jutai Kao
(74) *Attorney, Agent, or Firm* — Lee, Hong, Degerman, Kang & Waimey

(57) ABSTRACT

The present invention relates to a method for limiting measurement reports by limiting objects of measurement and evaluation for a measurement report, and user equipment therefore. The method for limiting measurement reports by user equipment in a mobile communication system according to the present invention comprises: receiving a cell list that includes information about at least one cell; receiving a measurement setup message that includes a measurement limiting command for limiting objects of measurement and evaluation to the at least one cell included in the cell list; measuring the quality of signals that are received from neighbor cells; performing the measurement and evaluation on the basis of the signal quality having been measured to determine whether the quality measurement should be reported; and transmitting a measurement report message that includes the information about measurement reports generated in accordance with the measurement and evaluation, wherein, in the measurement and evaluation step, whether the measurement should be reported is evaluated only for a received signal from the at least one cell included in the cell list.

12 Claims, 16 Drawing Sheets

(51) Int. Cl.
*H04W 24/10* (2009.01)
*H04L 5/00* (2006.01)

(56) References Cited

U.S. PATENT DOCUMENTS

2009/0036116 A1     2/2009  Kim et al.
2009/0247150 A1*   10/2009  Fischer et al. .............. 455/425
2010/0075675 A1*    3/2010  Yang et al. ................. 455/436
2011/0170418 A1*    7/2011  Sagfors et al. ............. 370/241
2012/0014267 A1*    1/2012  Gomes et al. .............. 370/252
2012/0094608 A1*    4/2012  Shi et al. ................. 455/67.11
2012/0244903 A1*    9/2012  Fong et al. ................ 455/517
2013/0244662 A1*    9/2013  Wager et al. .............. 455/436

* cited by examiner

METHOD AND APPARATUS OF LIMITING MEASUREMENT REPORTS

CROSS-REFERENCE TO RELATED APPLICATIONS

This application is the National Stage filing under 35 U.S.C. 371 of International Application No. PCT/KR2011/000436, filed on Jan. 21, 2011, which claims the benefit of U.S. Provisional Application Ser. No. 61/297,227, filed on Jan. 21, 2010, the contents of which are all incorporated by reference herein in their entirety.

TECHNICAL FIELD

The present invention relates to a method of restricting measurement reporting by restricting measurement evaluation objects for the measurement reporting and apparatus for the same.

BACKGROUND ART

In a mobile communication system, supporting mobility of a user equipment is mandatory. To this end, the user equipment continuously measures a quality of a serving cell currently providing a service and a quality of a neighboring cell. The user equipment reports a measurement result to a network at a proper time and the network then provides optimal mobility to the user equipment via handover and the like.

In order to provide information for helping a service provider operate the network as well as the mobility support, the user equipment performs a measurement for the specific purpose set up by the network and may be then able to report the corresponding measurement result to the network. For instance, the user equipment may receive broadcast information of a specific cell determined by the network. Based on the received broadcast information, the user equipment is able to report a cell identity (called a global cell identity) of the specific cell, location identification information (e.g., tracking area code) on a location to which the specific cell belongs, and other cell information (e.g., a presence or non-presence of membership in CSG (closed subscriber group) cell) to a serving cell.

While a user equipment is moving, if the user equipment confirms that a quality of a specific area is very poor via measurement, it may able to report location information on cells having poor quality and a result of the corresponding cell measurement to a network. Based on the report on the measurement results of user equipment helping the operation of the network, optimization of the network can be enhanced.

On performing measurement evaluation for a measurement reporting by a user equipment, all cells detected and measured by the user equipment are considered as measurement evaluation objects. Hence, even if a base station is interested in qualities of specific cells, and more particularly, in qualities of specific neighbor cells from the user equipment, the user equipment reports all cells that meet the measurement reporting reference among the cells detected and measured by the corresponding user equipment. In doing so, unnecessary measurement reporting may occur. Especially, if a base station sets up measurement of the user equipment on a plurality of frequencies to maintain optimal performance of the user equipment that use CA (carrier aggregation) and a plurality of cells or frequencies simultaneously, it may cause a problem that unnecessary measurements may be frequently performed.

DISCLOSURE OF THE INVENTION

Technical Tasks

Accordingly, the present invention is directed to substantially obviate one or more problems due to limitations and disadvantages of the related art. First of all, an object of the present invention is to provide a method of restricting a measurement evaluation object, which triggers a measurement reporting of a user equipment, to a specific cell desired by a base station.

Technical Solution

To achieve these and other advantages and in accordance with the purpose of the present invention, as embodied and broadly described, a method of restricting a measurement reporting, which is restricted by a user equipment in a mobile communication system, according to one embodiment of the present invention may include the steps of receiving a cell list including information on at least one cell from a serving cell, receiving a measurement configuration message including a measurement restriction command for restricting measurement evaluation objects to at least one cell included in the cell list from the serving cell, measuring qualities of signals received from adjacent cells, performing a measurement evaluation for determining whether to make a quality measurement reporting based on the measured qualities of the received signals, and transmitting a measurement reporting message including measurement reporting information on a result of the quality measurement to the serving cell, wherein the measurement evaluation performing step evaluates whether to make the measurement reporting of a measured quality of a signal received from the at least one cell included in the cell list in response to the measurement restriction command.

Preferably, the measurement configuration message may include a measurement object information, a reporting configuration information and a measurement identity for connecting the measurement object and the reporting configuration with each other. More preferably, the measurement evaluation performing step may include the step of determining whether the measurement result of the at least one cell meets a reporting reference in the reporting configuration information.

Preferably, the cell list may include a cell identity information of each one of the at least one cell and a frequency information of the corresponding cell. Preferably, the serving cell may be configured for each of a plurality of component carriers. Preferably, the measurement restriction command may be configured for a frequency of a component carrier corresponding to the serving cell.

Preferably, the measuring step may include the step of measuring the qualities of the signals received from the at least one cell included in the cell list only.

To further achieve these and other advantages and in accordance with the purpose of the present invention, a user equipment according to another embodiment of the present invention may include a receiving module receiving a cell list including information on at least one cell from a serving cell and a measurement configuration message including a measurement restriction command for restricting measurement evaluation objects to at least one cell included in the cell list from the serving cell, a processor measuring qualities of signals received from adjacent cells, the processor determining whether to make a quality measurement reporting based on the measured qualities of the received signals, and a transmitting module transmitting a measurement reporting message including measurement reporting information on a result of the quality measurement to the serving cell, wherein the processor evaluates whether to make the measurement reporting of a measured quality of a signal received from the at least one cell included in the cell list in response to the measurement restriction command.

Preferably, the serving cell may be configured for each of a plurality of component carriers. Preferably, the processor may measure the qualities of the signals received from the at least one cell included in the cell list only.

Advantageous Effects

According to the above-mentioned embodiments of the present invention, a user equipment prevents an unnecessary measurement reporting from being generated to deliver a necessary measurement reporting to a base station only, thereby using a radio resource more efficiently.

Especially, when a base station configures various measurements on a user equipment to provide optimal performance to the user equipment, the present invention may bring an effect of preventing the generation of an unnecessary measurement reporting.

MODE FOR INVENTION

Reference will now be made in detail to the preferred embodiments of the present invention, examples of which are illustrated in the accompanying drawings. The detailed description disclosed together with the accompanying drawings intends to explain exemplary embodiments of the present invention instead of representing a unique embodiment of the present invention. For instance, although the following descriptions are made in detail on the assumption that a mobile communication system includes 3GPP LTE based system, the following descriptions are variously applicable as a method for a user equipment to restrict a measurement reporting in various kinds of mobile communication systems such as IEEE 802.16 based systems and the like to which cell quality measuring technology is applicable.

The following detailed description of the invention includes details to help the full understanding of the present invention. Yet, it is apparent to those skilled in the art that the present invention can be implemented without these details. Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

As mentioned in the foregoing description, a method of restricting a measurement reporting by restricting measurement evaluation objects for a measurement reporting is explained as follows. To this end, 3GPP LTE system is schematically described as one example of a mobile communication system to apply this technology thereto.

Figure 1:
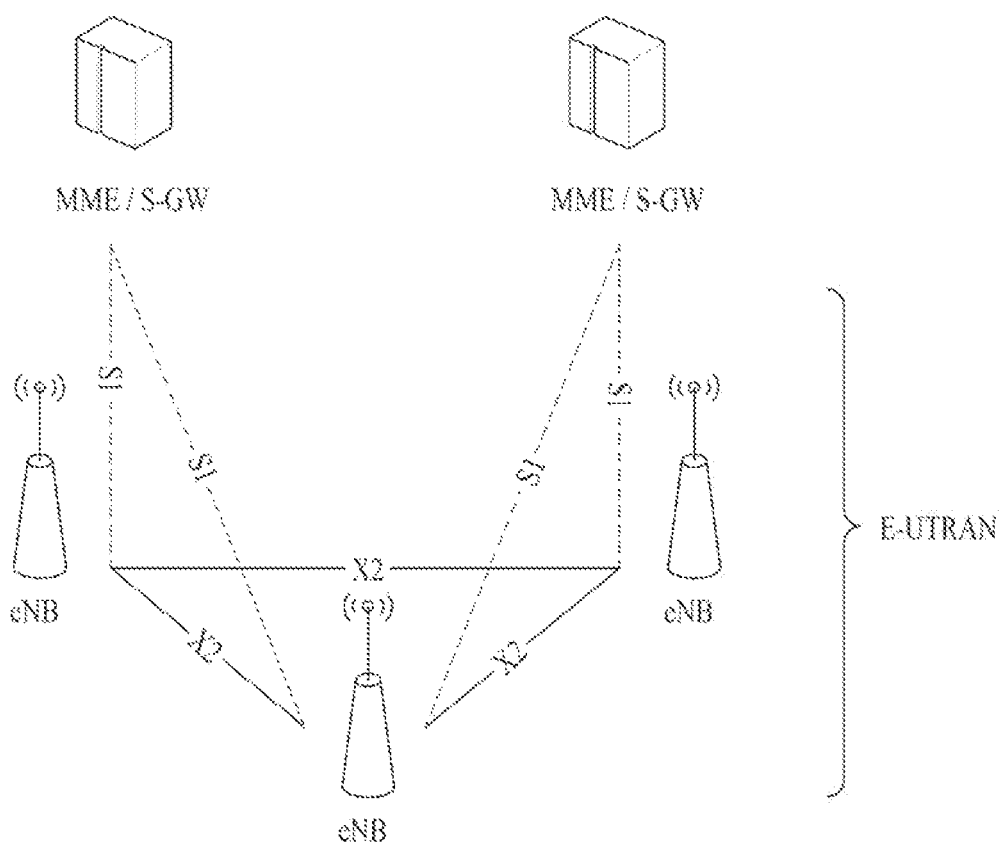
FIG. 1 is a diagram of a network structure of E-UTRAN (evolved universal terrestrial radio access network) for example of a mobile communication system.

FIG. 1 is a diagram of a network structure of E-UTRAN (evolved universal terrestrial radio access network) for example of a mobile communication system. E-UTRAN (evolved universal terrestrial radio access network) is the system evolved from the conventional UTRAN and its basic standardization is in progress by 3GPP. The E-UTRAN system is called LTE (long term evolution) system.

The E-UTRAN includes eNBs (e-NodeBs or base stations). The eNBs are connected to each other via X2 interface. The eNB is connected with a user equipment (hereinafter abbreviated UE) via wireless interface and is connected to EPC (evolved packet core) via S1 interface.

The EPC may include a mobility management entity (hereinafter abbreviated MME), a serving-gateway (hereinafter abbreviated S-GW), and a packet data network-gateway (hereinafter abbreviated PDN-GW). The MME has access information of the UE or information on capability of the UE. Such information is mainly used for the mobility management of the UE. The S-GW is a gateway having the E-UTRAN as a terminal end point. And, the PDN-GW is a gateway having the PDN as a terminal end point.

Layers of a radio interface protocol between a user equipment and a network may be divided into L1 ($1^{st}$ layer), L2 ($2^{nd}$ layer) and L3 ($3^{rd}$ layer) based on 3 lower layers of an open system interconnection (OSI) reference model widely known to the communication system. In these layers, a physical layer belonging to the $1^{st}$ layer provides an information transfer service using a physical channel and a radio resource control (hereinafter abbreviated RRC) situated in the $3^{rd}$ layer plays a role in controlling radio resources between the user equipment and the network. For this, the RRC layer plays a role in exchanging RRC message between a user equipment and a base station.

Figure 2:
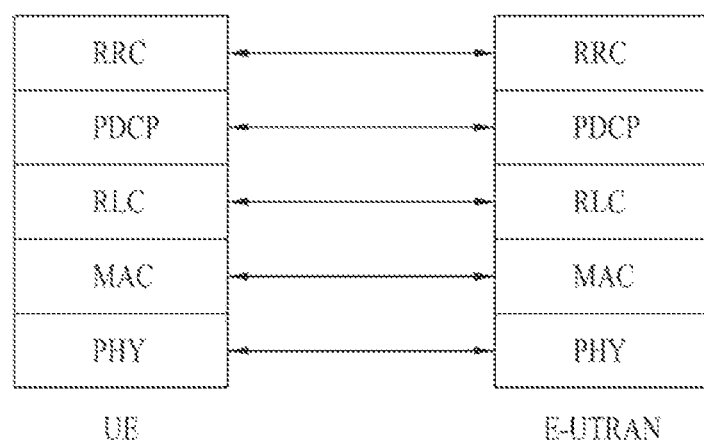
FIG. 2 and FIG. 3 are diagrams of structures of a radio interface protocol between UE (user equipment) and E-UTRAN based on 3GPP radio access network specifications.
Figure 3:
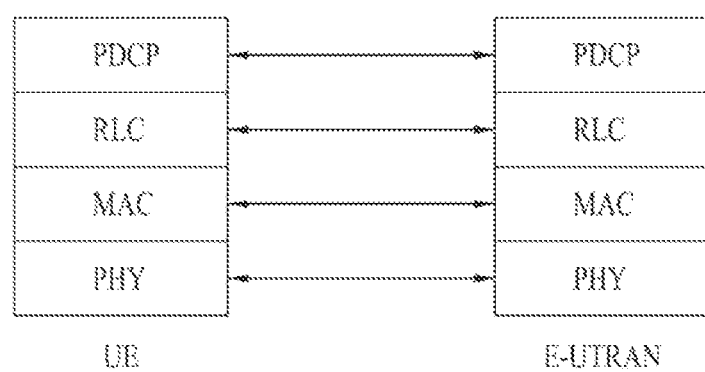

FIG. 2 and FIG. 3 show structures of a radio interface protocol between UE and E-UTRAN based on 3GPP radio access network specifications, respectively.

A radio interface protocol is horizontally constructed with a physical layer, a data link layer and a network layer. And, the radio interface protocol can be vertically divided into a user plane (hereinafter abbreviated U-plane) for a data information transfer and a control plane (hereinafter abbreviated C-plane) for a delivery of a control signal (i.e., signaling). The protocol layers shown in FIG. 2 or FIG. 3 can be divided into a first layer L1, a second layer L2 and a third layer L3 based on three lower layers of OSI (open system interconnection) reference model widely known to the communication systems. The radio protocol layers exist as pairs in UE and E-UTRAN and are responsible for the data transfer in a radio section.

In the following description, the layers of the radio protocol control plane shown in FIG. 2 and the layers of the radio protocol user plane shown in FIG. 3 are explained.

First of all, a physical layer of the first layer provides an information transfer service to an upper layer using a physical channel. The physical layer is connected to a medium access control (MAC) layer above the physical layer via a transport channel. And, data is transferred between the medium access control layer and the physical layer through the transport channel. Data is transferred between different physical layers, and more particularly, between a physical layer of a transmitting side and a physical layer of a receiving side. The physical layer is modulated by OFDM (orthogonal frequency division multiplexing) scheme and utilizes time and frequency as radio resources.

A medium access control (hereinafter abbreviated MAC) of the second layer provides a service to a radio link control layer, which is an upper layer, via a logical channel. The radio link control layer (hereinafter abbreviated RLC) of the second layer supports a reliable data transport. And, a function of the RLC layer can be implemented with a function block within the MAC layer. In this case, the RLC layer may not exist. A PDCP layer of the second layer performs a header compression function for reducing an IP packet header size, which is relatively big and carries unnecessary control information, to efficiently transmit such an IP packet as IPv4, IPv6 and the like in a radio section having a narrow bandwidth.

A radio resource control (hereinafter abbreviated RRC) layer situated at the top of the third layer is defined in a control plane only. The RRC layer is responsible for controlling logical channels, transport channels and physical channels in association with configuration, reconfiguration and release of radio bearers (hereinafter abbreviated RBs). In this case, the RB means a service provided by the second layer for the data delivery between the UE and the E-UTRAN. In case that an RRC connection is established between the RRC layer of the UE and the RRC layer of the E-UTRAN, the UE is in an RRC connected sate (RRC_CONNECTED). Otherwise, the UE is in an RRC idle state (RRC_IDLE).

Downlink transport channels for transporting data to a user equipment from a network may include a broadcast channel (BCH) for transporting system information and a downlink shared channel (SCH) for transmitting user traffic, control message and/or the like. Traffic or control message of a downlink multicast or broadcast service may be transmitted on the downlink SCH or a separate downlink multicast channel (MCH). Meanwhile, uplink transport channels for transporting data to a network from a user equipment may include a random access channel (RACH) for transmitting an initial control message and an uplink shared channel (SCH) for transmitting user traffic, control message and/or the like.

Logical channel, which is situated above the transport channel to be mapped thereto, may include one of BCCH (Broadcast Channel), PCCH (Paging Control Channel), CCCH (Common Control Channel), MCCH (Multicast Control Channel), MTCH (Multicast Traffic Channel) and the like.

Physical channel consists of several subframes on time axis and several subcarriers on frequency axis. In particular, one subframe consists of a plurality of symbols on time axis. One subframe consists of a plurality of resource blocks. And, one resource block consists of a plurality of symbols and a plurality of subcarriers. Each subframe may be able to use specific subcarriers of specific symbols (e.g., $1^{st}$ symbol) of a corresponding subframe for PDCCH (physical downlink control channel) i.e., L1/L2 control channel. On subframe may consist of 2 slots each of which has a length of 0.5 ms, which may amount to 1 ms corresponding to TTI (transmission time interval) as a unit time for transmitting data.

In the following description, an RRC state of a user equipment and an RRC connection method are explained.

First of all, the RRC state means whether an RRC of a user equipment has a logical connection with an RRC of E-UTRAN. If the RRCs are connected with each other, it is called RRC_CONNECTED state. If the RRCs are not connected with each other, it is called RRC_IDLE state. Since RRC connection exists in a user equipment in RRC_CONNECTED state, E-UTRAN is able to recognize a presence of the corresponding user equipment. Hence, the E-UTRAN is able to effectively control the user equipment. On the contrary, E-UTRAN is unable to recognize a user equipment in RRC_IDLE state. And, this user equipment is managed by a core network by a tracking area unit which is a unit of an area larger than a cell. In particular, a presence or non-presence of a user equipment in RRC_IDLE state is recognizable by a larger area unit and should enter RRC_CONNECTED state to receive such a general mobile communication service as a voice service and a data service.

When a user of a user equipment initially turns on a power of the user equipment, the user equipment searches for a suitable cell and then stays in RRC_IDLE state in the corresponding cell. If the user equipment staying in the RRC_IDLE state needs to establish an RRC connection, it establishes the RRC connection with an RRC of E-UTRAN by RRC connection procedure and then enters RRC_CONNECTED state. The user equipment in the idle state may need to establish an RRC connection due to the following reasons. First of all, an uplink data transmission is necessary due to a user's call attempt and the like. Secondly, if a paging message is received from E-UTRAN, it is necessary to send a response message in response to the received paging message.

NAS (non-access stratum) layer situated above RRC layer performs such a function as a session management and a mobility management and the like.

In order for the NAS layer to manage mobility of a user equipment, two kinds of states EMM-REGISTERED (EPS mobility Management-REGISTERED) and EMM-DEREGISTERED. These two states may apply to a user equipment and an MME. A user equipment in an early stage is in RMM-DEREGISTERED state. In order to access a network, this user equipment performs a process for registering with the corresponding network via an initial attach procedure. If the attach procedure is successfully completed, the user equipment and the MME are in EMM-REGISTERED states.

In order to manage a signaling connection between a user equipment and an EPC, two kinds of states ECM-IDLE (EPS connection management) and ECM-CONNECTED are defined. These two states may apply to a user equipment and an MME. If a user equipment in ECM-IDLE state establishes an RRC connection with E-UTRAN, the corresponding user equipment is in ECM-CONNECTED state. If MME in ECM-ILDE establishes S1 connection with E-UTRAN, it the corresponding MME is in ECM-CONNECTED state. When a user equipment is in ECM-IDLE state, E-UTRAN may not have context information of the user equipment. Hence, the user equipment in ECM-IDLE state may perform a UE based mobility related procedure such as a cell selection and a cell reselection without receiving a command given by a network. On the contrary, when a user equipment in ECM-CONNECTED state, mobility of the user equipment is managed by a command of a network. If a location of a user equipment in ECM-IDLE state deviates from a location known to a network, the user equipment informs the network of a corresponding location of the user equipment through a tracking area update procedure.

System information is described as follows.

First of all, system information includes mandatory information that a user equipment should know to access a base station. Hence, the user equipment should receive all system information before accessing the base station and should have latest system information all the time. Since the system information is the information that all user equipment within one cell should know, the base station periodically transmits the system information.

The system information may be divided into MIB, SB, SIB and the like. The MIB (master information block) enables a user equipment to know a physical configuration (e.g., bandwidth, etc.) of a corresponding cell. The SB (scheduling block) indicates transmission information of SIBs, e.g., transmission period and the like. The SIB (system information block) is a set of system information associated with each other. For instance, one SIB contains information of a neighbor cell only and another SIB contains information on an uplink radio channel used by a user equipment only.

Meanwhile, services provided to a user equipment by a network may be classified into three kinds of types. In accordance with what kind of service can be provided, a user equipment recognizes a cell type differently as well. IN the following description, service types and cell types are explained in turn.

1) Limited service: This service provides an emergency call and ETWS and may be provided in acceptable cell.

2) Normal service: This service means a universal service for a public use and may be provided in a suitable cell.

3) Operator service: This service means a service for a communication network service provider. This cell is available for the communication network service provider only. This cell is not available for general users.

In association with a service type provided by a cell, a type of cell may be classified as follows.

1) Acceptable cell: A user equipment can be provided with a limited service by this cell. In aspect of a corresponding user equipment, this cell satisfies a cell selection reference of the user equipment without being barred.

2) Suitable cell: A user equipment can be provided with a normal service. This cell satisfies a condition of an acceptable cell and also additional conditions. According to the additional conditions, this cell should belong to PLMN that can be accessed by a corresponding user equipment and a user equipment is not restricted from performing a tracking area update procedure. If a corresponding cell is a CSG cell, a user equipment should be able to access this cell as a CSG member.

3) Barred cell: This cell broadcasts information called a bared cell via system information.

4) Reserved cell: This cell broadcasts information called a reserved cell via system information.

Meanwhile, a radio link failure procedure in 3GPP LTE system is described as follows.

Figure 4:
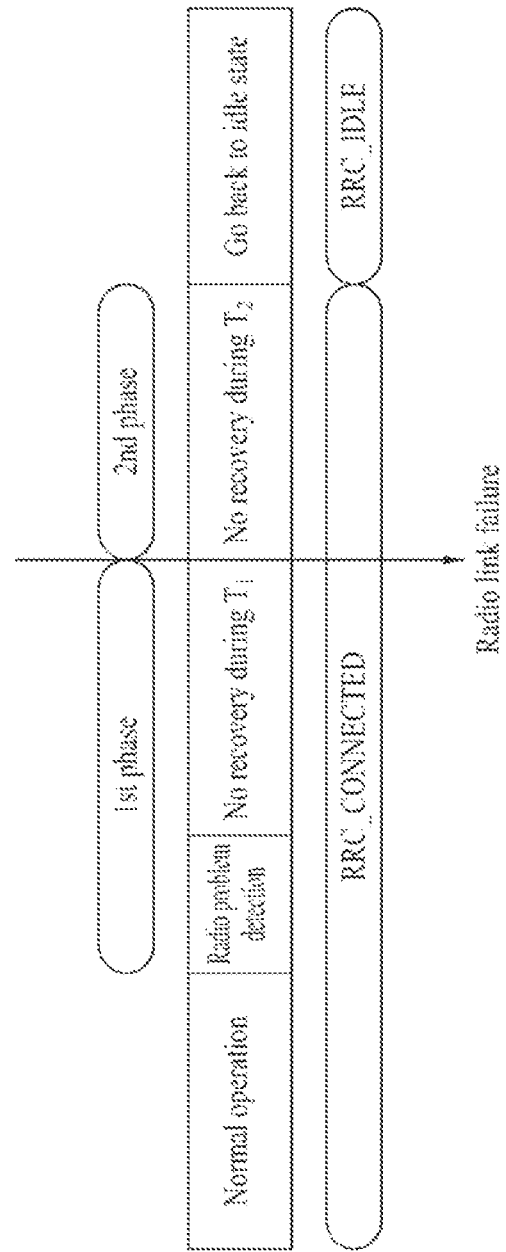
FIG. 4 is a diagram to describe an operation related to radio link failure.

FIG. 4 is a diagram to describe an operation associated with radio link failure.

First of all, when a user equipment is receiving a service from a cell, in order to maintain a quality of a communication link with the corresponding cell, the user equipment persistently performs measurement. In particular, the user equipment determines whether the quality of the communication link with the currently service-providing cell is a communication-unavailable situation. If the user equipment determines that the quality of the current cell is too poor to perform a communication, the user equipment declares a radio link failure. Once the user equipment declares the radio link failure, the user equipment stops maintaining the communication with the corresponding cell, selects a cell by a cell selection procedure, and then attempts an RRC connection re-establishment. Thus, the operation related to the radio link failure may be described as two phases shown in FIG. 4.

In a first stage, a user equipment checks whether a current communication link has a problem. If the problem is detected, the user equipment declares a radio link problem and then waits for a recovery of the communication link during a predetermined time T1. If the corresponding link is recovered during this time, the user equipment continues a normal operation. If the radio link problem is not solved during T1 in the first state, the user equipment declares a radio link failure and then enters a second stage.

In the second stage, the user equipment performs an RRC connection re-establishment procedure for the recovery from the radio link failure.

The RRC connection re-establishment procedure is the procedure for re-establishing an RRC connection in RRC_CONNECTED state. Since a user equipment remains in the RRC_CONNECTED state (i.e., the user equipment does not enter RRC_IDLE state), the user equipment does not initialize all radio configurations (e.g., radio bearer configurations) of the user equipment. In stead, the user equipment temporarily suspends a use of all radio bearers except SRB0 on starting the RRC connection re-establishment procedure. If the RRC connection re-establishment is successfully completed, the user equipment resumes the use of the temporarily suspended radio bearers.

Figure 5:
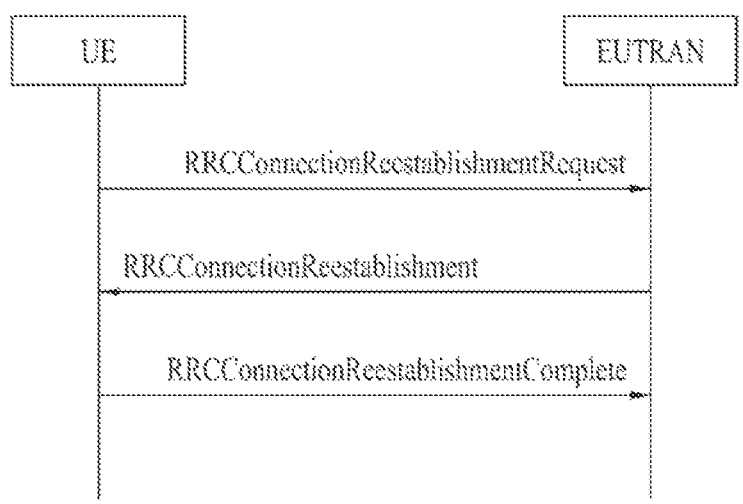
FIG. 5 and FIG. 6 show successful and failure cases of an RRC connection re-establishment procedure, respectively.
Figure 6:
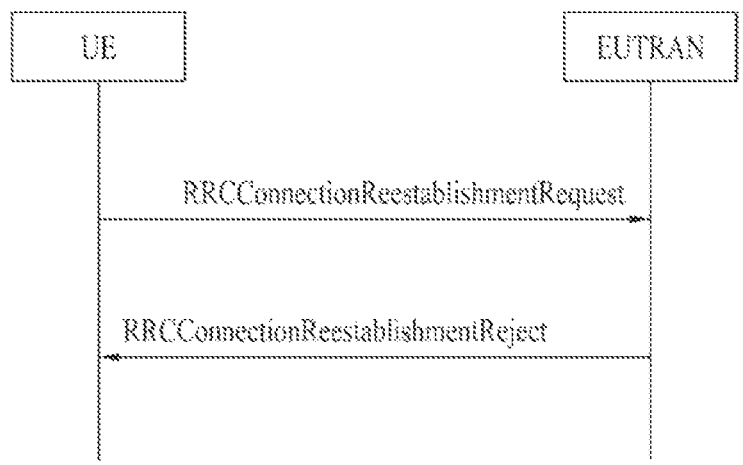

FIG. 5 and FIG. 6 show successful and failure cases of an RRC connection re-establishment procedure, respectively.

Referring to FIG. 5 and FIG. 6, according to an operation of a user equipment in an RRC connection re-establishment procedure, the user equipment firstly selects one cell by performing a cell selection. The user equipment receives system information from the selected cell to receive basic parameters for a cell access. Subsequently, the user equipment attempts an RRC connection re-establishment through a random access procedure. In case that the cell selected by the user equipment through the cell selection is the cell having a context of the user equipment, i.e., a prepared cell, the corresponding cell may accept an RRC connection re-establishment request made by the user equipment. Hence, the RRC connection re-establishment procedure may be successfully completed.

On the contrary, if the cell selected by the user equipment is not the prepared cell, since the corresponding cell does not have the context of the user equipment, the corresponding cell rejects the RRC connection re-establishment request made by the user equipment. Hence, the RRC connection re-establishment procedure fails.

Figure 7:
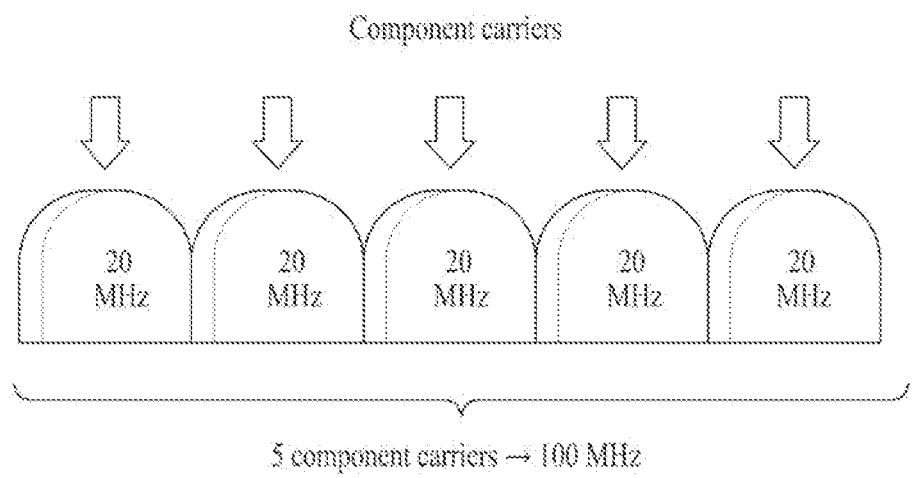
FIG. 7 is a diagram to describe a component carrier aggregation technology applied to 3GPP LTE-A system.

FIG. 7 is a diagram to describe a component carrier aggregation technology applied to 3GPP LTE-A system.

LTE-A technology standard is IMT-Advanced candidate technology of ITU (international telecommunication union) and is designed to coincide with IMT-Advanced technology requirements. Hence, in order to satisfy the requirements of ITU, the ongoing discussion on extending a bandwidth wider than that of a legacy LTE system is made by LTE-A.

In order to extend a bandwidth in LTE-A system, a carrier of a legacy LTE system is defined as a component carrier (hereinafter abbreviated CC) and maximum 5 component carriers are combined to be used in the ongoing discussion. Since CC may be able to have a maximum bandwidth of 20 MHz like the LTE system, a bandwidth may be conceptionally extensible up to maximum 100 MHz. Thus, the technique of using a plurality of component carriers (CCs) by combining them together is called carrier aggregation (hereinafter abbreviated CA).

Figure 8:
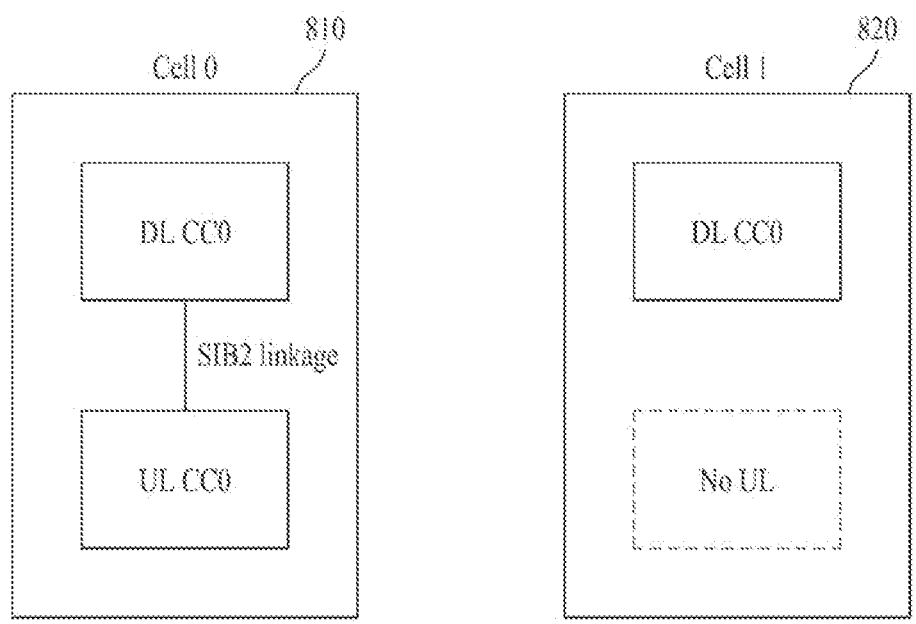
FIG. 8 is a diagram to describe definition of a cell in aspect of a user equipment in case of applying a component carrier aggregation technology.

FIG. 8 is a diagram to describe definition of a cell in aspect of a user equipment in case of applying a carrier aggregation technology.

First of all, as mentioned in the foregoing description with reference to FIG. 7, if the CA is applied, a plurality of CCs may be included for each of downlink (hereinafter abbreviated DL) and uplink (hereinafter abbreviated UL). In this system, a combination 810 of DL CC and UL CC (e.g., cell 0 in FIG. 8) or a DLL CC 820 (e.g., cell 1 in FIG. 8) only may be regarded as a cell in aspect of a user equipment. Referring to FIG. 8, a linkage relation between DL CC and UL CC may be indicated via system information carried on DL resource. In particular, system information of a CA applied mobile communication system contains information on a linkage relation between UL CC and DL CC in addition to the aforementioned system information, which is illustrated as SIB2 linkage in FIG. 8.

In the following description, a measurement and a measurement reporting are explained.

Regarding mobility support of a user equipment in a mobile communication system, the user equipment continuously measures a quality of a serving cell currently providing a service and a quality of a neighboring cell. The user equipment reports a measurement result to a network at a proper time and the network then provides optimal mobility to the user equipment via handover and the like.

In order to provide information for helping a service provider operate the network as well as the mobility support, the user equipment performs a measurement for the specific purpose set up by the network and may be then able to report the corresponding measurement result to the network. For instance, the user equipment may receive broadcast information of a specific cell determined by the network. And, the user equipment is able to report a cell identity (called a global cell identity) of the specific cell, location identification information (e.g., tracking area code) on a location to which the specific cell belongs, and other cell information (e.g., a presence or non-presence of membership in CSG (closed subscriber group) cell) to a serving cell.

While a user equipment is moving, if the user equipment confirms that a quality of a specific area is very poor via measurement, it may able to report location information on cells having poor quality and a measurement result to a network. Based on the report on the measurement results of user equipment helping the operation of the network, optimization of the network can be enhanced.

In a mobile communication system having a frequency reuse factor set to 1, mobility is mostly performed between different cells on the same frequency band. Hence, in order to secure good mobility of a user equipment, the user equipment needs to measure quality of neighbor cells having center frequency equal to that of a serving cell and cell information well. Thus, the measurement of a cell having a center frequency equal to that of a serving cell is called intra-frequency measurement. A user equipment performs intra-frequency measurement and then reports a result of the measurement to a network at a proper time, whereby the object of the corresponding measurement result can be achieved.

A mobile communication service provider may operate a network using a plurality of frequency bands. In case that a service of a communication system is provided on a plurality of frequency bands, in order to secure optimal mobility of a user equipment, the user equipment should be able to well measure qualities of neighbor cells having center frequency different from that of a serving cell and cell information. Thus, the measurement of a cell having a center frequency different from that of a serving cell is called inter-frequency measurement. A user equipment performs inter-frequency measurement and should be then able to report a result of the measurement to a network at a proper time.

When a user equipment supports measurement of a heterogeneous network, the user equipment may be able to perform measurement on the heterogeneous network in accordance with a base station configuration. This measurement of the heterogeneous network is called inter-RAT (inter-radio access technology) measurement. For instance, RAT may include UTRAN (UMTS terrestrial radio access network) and GERAN (GSM EDGE radio access network) according to 3GPP Standard Specifications or may include CDMA 2000 system according to 3GPP2 Standard Specifications as well.

Figure 9:
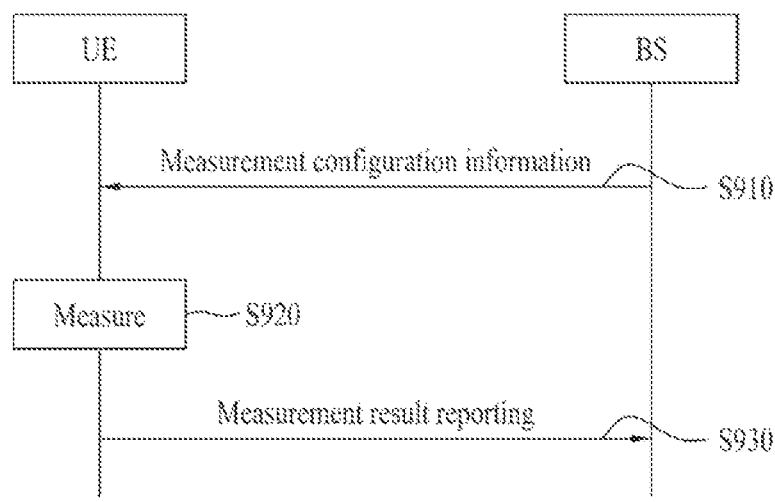
FIG. 9 is a diagram to describe a process for a user equipment to perform a measurement and report a measurement result to a network in 3GPP LTE system.

FIG. 9 is a diagram to describe a process for a user equipment to perform a measurement and report a measurement result to a network in 3GPP LTE system.

First of all, referring to FIG. 9, a user equipment may be able to receive measurement configuration information from a base station [S910]. In the following description, a message containing this measurement configuration information is named a measurement configuration message. Based on the measurement configuration information, the user equipment may be ale to perform a measurement [S920]. If a measurement result meets a reporting condition within the measurement configuration information, the user equipment may be able to report the measurement result to the base station [S930]. In the following description, a message containing the measurement result shall be named a measurement reporting message.

Figure 10:
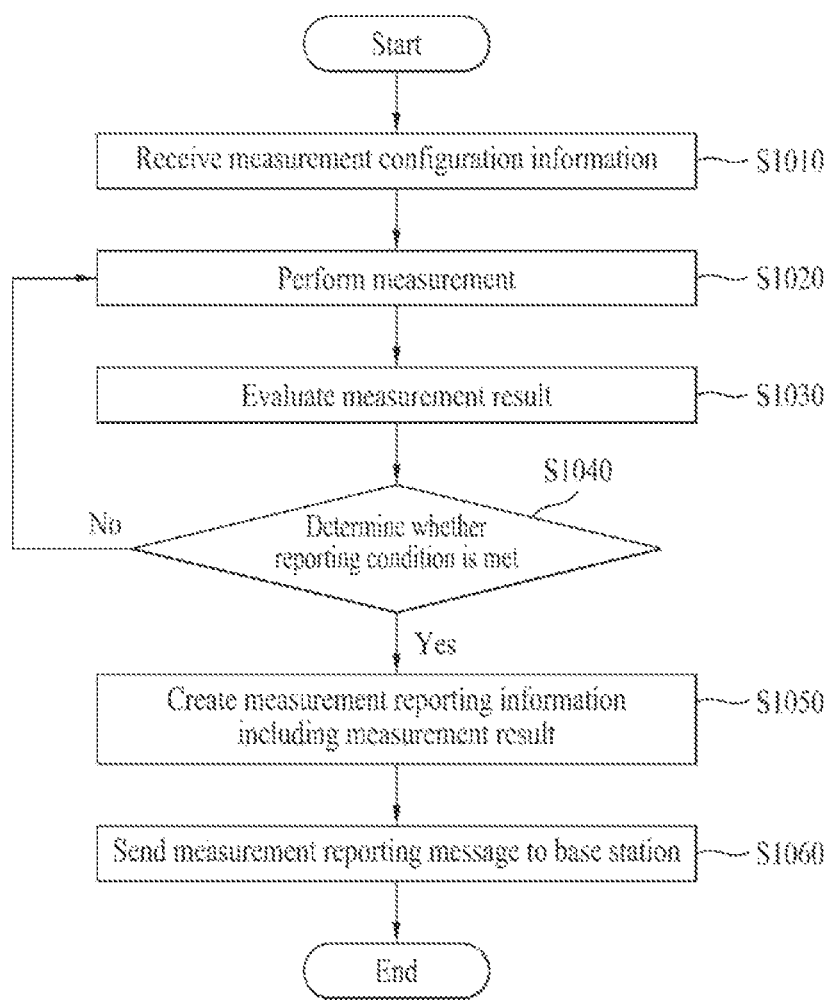
FIG. 10 is a flowchart for a measuring and reporting operation of a user equipment.

FIG. 10 is a flowchart for a measuring and reporting operation of a user equipment.

With reference to FIG. 10, in aspect of a user equipment, an operation of receiving a measurement setup message from a base station and then transmitting a measurement reporting message is described as follows.

First of all, a user equipment receives measurement configuration information from a base station [S1010]. The user equipment performs measurement based on the measurement configuration information [S1020]. Base on a result of the measurement, the user equipment evaluates the measurement result [S1030]. The user equipment determines whether the measurement result meets the reporting condition [S1040]. If the reporting condition is not met, the measurement is performed again. If the measurement result meets the reporting condition, a measurement reporting information including the measurement result is created [S1050]. The user equipment sends a measurement reporting message including the created measurement reporting information to the base station [S1060].

The measurement configuration information may contain the following informations.

1) Measurement object information: This information relates to an object on which a measurement will be performed by a user equipment. The measurement object may include at least one of an intra-frequency measurement object as an object of an intra-cell measurement, an inter-frequency measurement object and an object of an inter-cell measurement and an inter-RAT measurement object as an object of an inter-RAT measurement. For instance, the intra-frequency measurement object may indicate a neighbor cell having the same frequency band of a serving cell, the inter-frequency measurement object may indicate a neighbor cell having a frequency band different from that of a serving cell, and the inter-RAT measurement object may indicate a neighbor cell of RAT different from that of a serving cell.

2) Reporting configuration information: This information relates to a reporting condition relating to when a user equipment reports a measurement result and a reporting type. The reporting condition may include information on an event or period for triggering a reporting of a measurement result. And, the reporting type is the information indicating what kind of type will be used to configure a measurement result.

3) Measurement identity information: This information enables a user equipment to determine a time and type for reporting a prescribed measurement object by associating a measurement object and a reporting configuration with each other. The measurement identity information is contained in a measurement reporting message and may indicate that a measurement result relates to a prescribed measurement object and that a measurement reporting is generated on a prescribed reporting condition.

4) Quantity configuration information: This information relates to a parameter for configuring a filtering of a measurement unit, a reporting unit and/or a measurement result value.

5) Measurement gap information: This information related to a measurement gap of an interval usable for a user equipment to perform a measurement only without considering a data transmission to a serving cell because a downlink or uplink transmission is not scheduled.

According to the 3GPP standard document, TS 36.331, a structure of a message used for measurement configuration is shown in Table 1. A measurement configuration message may have measurement objects, a measurement reporting configuration list (reporting configurations), a measurement identity list (measurement identities) and other parameter informations (other parameters). Table 1 is represented as including these informations for one example of the measurement configuration message.

TABLE 1

```
RRCConnectionReconfiguration-r8-IEs ::= SEQUENCE {
    measConfig                MeasConfig                    OPTIONAL,    -- Need ON
}

MeasConfig ::=                SEQUENCE {
    -- Measurement objects
    measObjectToRemoveList    MeasObjectToRemoveList        OPTIONAL,    -- Need ON
    measObjectToAddModList    MeasObjectToAddModList        OPTIONAL,    -- Need ON
    -- Reporting configurations
    reportConfigToRemoveList  ReportConfigToRemoveList      OPTIONAL,    -- Need ON
    reportConfigToAddModList  ReportConfigToAddModList      OPTIONAL,    -- Need ON
    -- Measurement identities
    measIdToRemoveList        MeasIdToRemoveList            OPTIONAL,    -- Need ON
    measIdToAddModList        MeasIdToAddModList            OPTIONAL,    -- Need ON
    -- Other parameters
    quantityConfig            QuantityConfig                OPTIONAL,    -- Need ON
    measGapConfig             MeasGapConfig                 OPTIONAL,    -- Need ON
    s-Measure                 RSRP-Range                    OPTIONAL,    -- Need ON
    preRegistrationInfoHRPD   PreRegistrationInfoHRPD       OPTIONAL,    -- Need OP
    speedStatePars    CHOICE {
        release                   NULL,
        setup                     SEQUENCE {
            mobilityStateParameters   MobilityStateParameters,
            timeToTrigger-SF          SpeedStateScaleFactors
        }
    }                                                       OPTIONAL,    -- Need ON
    ...
}
```

In 3GPP LTE system, a base station may configure a single measurement object on a single frequency band for a user equipment. According to Paragraph 5.5.4 of 3GPP TS 36.331 V8.5.0 (2009-03) "Evolved Universal Terrestrial Radio Access (E-UTRA) Radio Resource Control (RRC); Protocol specification (Release 8)", events for triggering measurement reporting are defined as Table 2.

TABLE 2

| Event | Reporting Condition |
| --- | --- |
| Event A1 | Serving becomes better than threshold |
| Event A2 | Serving becomes worse than threshold |

TABLE 2-continued

| Event | Reporting Condition |
|---|---|
| Event A3 | Neighbour becomes offset better than serving |
| Event A4 | Neighbour becomes better than threshold |
| Event A5 | Serving becomes worse than threshold 1 and neighbour becomes better than threshold d2 |
| Event B1 | Inter RAT neighbour becomes better than threshold |
| Event B2 | Serving becomes worse than threshold 1 and inter RAT neighbour becomes better than threshold 2 |

If a measurement result of a user equipment satisfies the above-configured event, the user equipment sends a measurement reporting message to a base station.

Figure 11:
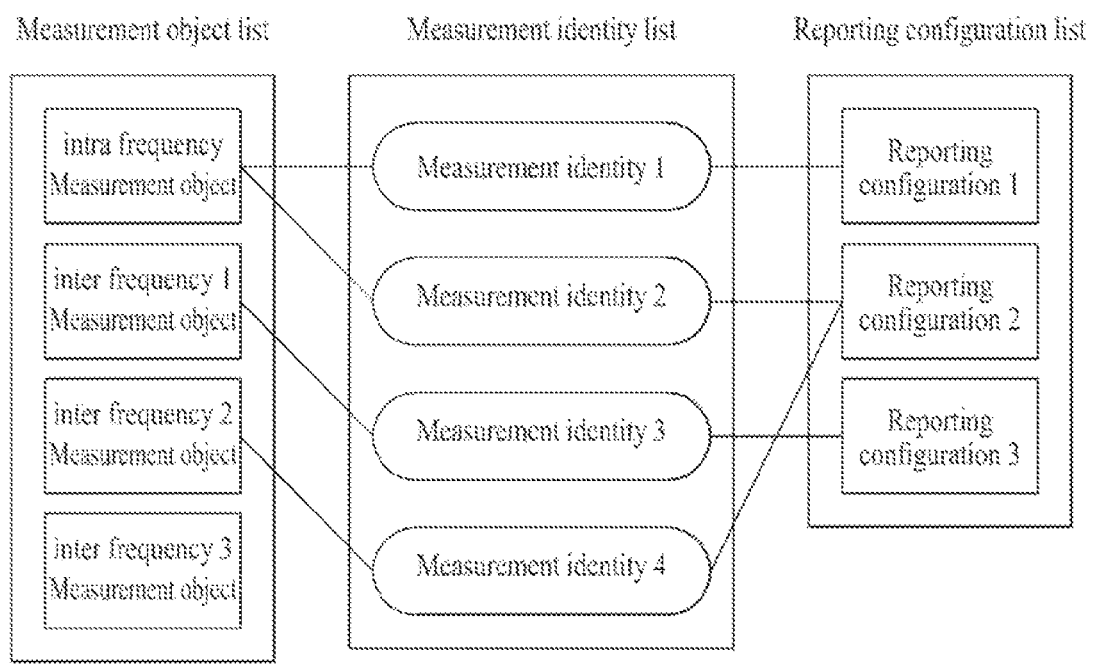
FIG. 11 shows one example of a measurement setup configured for a user equipment.

FIG. 11 shows one example of a measurement configuration set for a user equipment.

In the example shown in FIG. 11, a measurement identity 1 connects an intra-frequency measurement object and a reporting configuration 1 with each other. In this case, a user equipment performs an intra frequency measurement and the reporting configuration 1 is used to determine a reference and reporting type of a measurement result reporting.

Although a measurement identity 2 is connected with an intra-frequency measurement object like the measurement identity 1, it connects an intra-frequency measurement object to a reporting configuration 2. A user equipment performs an intra-frequency measurement and the reporting configuration 2 is used to determine a reference and reporting type of a measurement result reporting.

By the measurement identity 1 and the measurement identity 2, a user equipment transmits a measurement result to a network even if the measurement result on the intra-frequency object meets one of the reporting configuration 1 and the reporting configuration 2.

A measurement identity 3 connects an inter-frequency measurement object 1 and a reporting configuration 3 with each other. If a measurement result on the inter-frequency measurement object 1 meets a reporting condition contained in the reporting configuration 1, a user equipment reports a measurement result to a network.

A measurement identity 4 connects an inter-frequency measurement object 2 and a reporting configuration 2 with each other. If a measurement result on the inter-frequency measurement object 2 meets a reporting condition contained in the reporting configuration 2, a user equipment reports a measurement result to a network.

Meanwhile, it may be able to add, change and/or remove a measurement object, a reporting configuration and/or a measurement identity. This may be instructed in a manner that a base station sends a new measurement configuration message or a measurement configuration change message.

Figure 12:
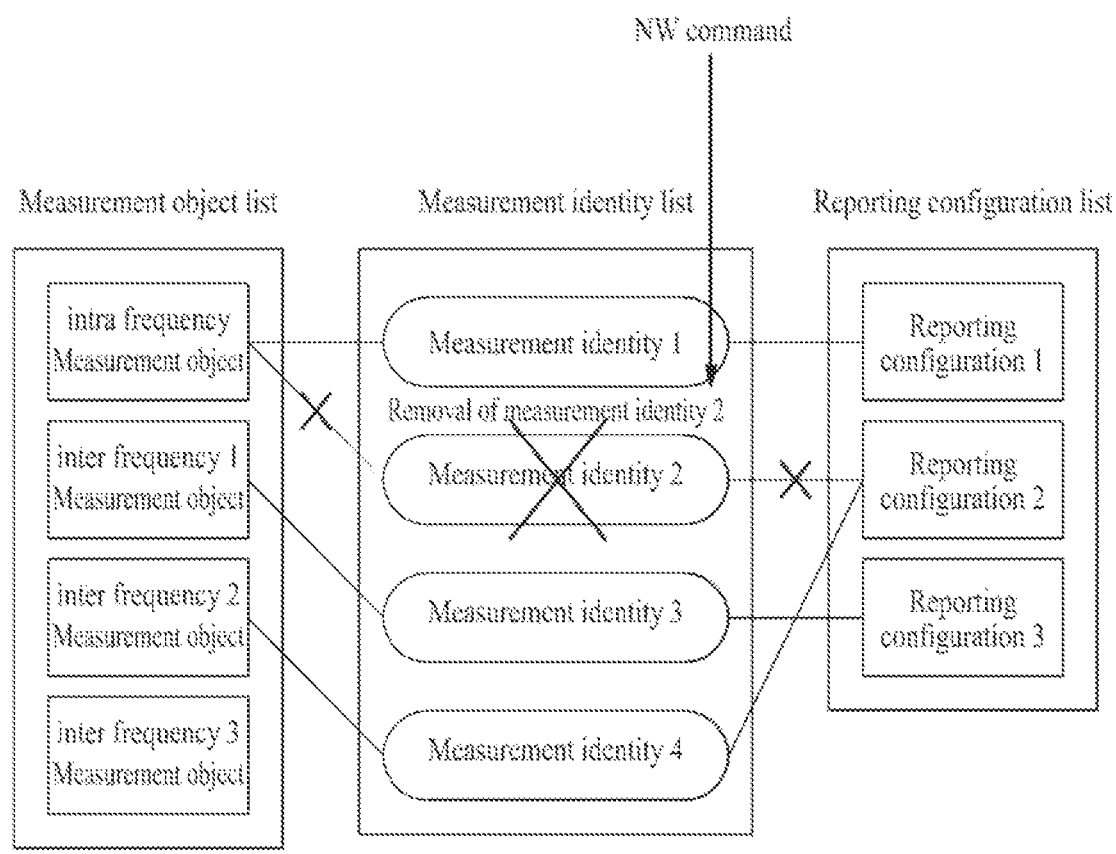
FIG. 12 shows one example of removing a measurement identity.

FIG. 12 shows one example of removing a measurement identity.

Referring to FIG. 12, 'NW command' may include a measurement configuration message or a measurement configuration change message for instructing a measurement identity to be removed. If the measurement identity 2 is removed, a measurement of a measurement object associated with the measurement identity 2 is stopped and a measurement reporting is not transmitted. Yet, the measurement object or reporting configuration associated with the removed measurement identity may not be changed.

Figure 13:
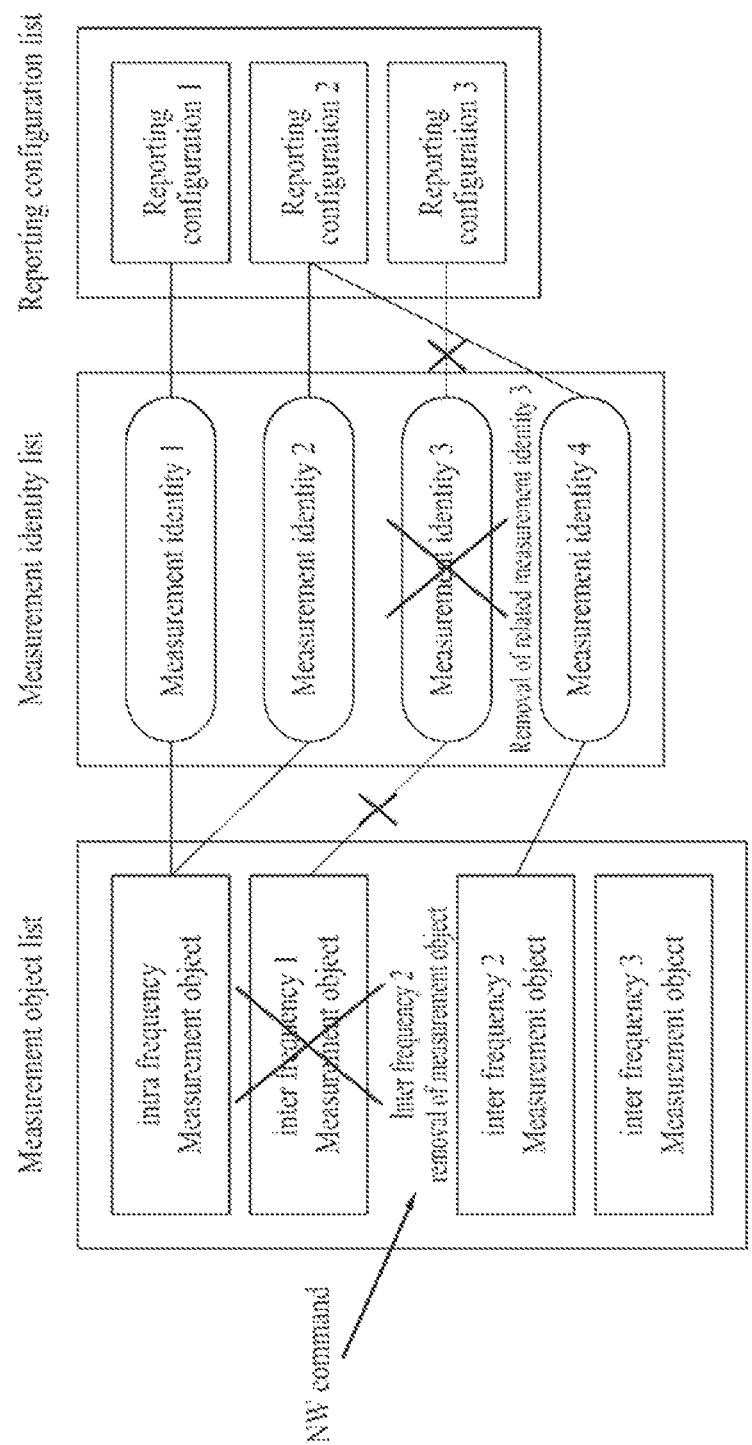
FIG. 13 shows one example of removing a measurement object.

FIG. 13 shows one example of removing a measurement object.

Referring to FIG. 13, 'NW command' may include a measurement configuration message or a measurement configuration change message for instructing an inter-frequency measurement object 1 to be removed. If the inter-frequency measurement object 1 is removed, a user equipment may be able to receive an associated measurement identity 3 as well. Hence, a measurement of the inter-frequency measurement object 1 is stopped and a measurement reporting may not be transmitted. Yet, the reporting configuration associated with the removed inter-frequency measurement object 1 may not be changed or deleted.

If the reporting configuration is removed, the user equipment removes the associated measurement identity as well. The user equipment stops a measurement of a measurement of a measurement object associated by the associated measurement identity and a corresponding measurement reporting. Yet, the measurement object associated with the removed reporting configuration may not be changed or removed.

Having received the measurement configuration, the user equipment performs measurement on the measurement object having the measurement identity connected thereto. Regarding the performed measurement result, the user equipment evaluates whether the result meets the measurement reporting condition based on the reporting configuration included in the measurement configuration. As a result of the evaluation, if the reporting reference included in the reporting configuration is met, the user equipment sends a measurement reporting message including the measurement reporting information to a network.

The measurement reporting information includes the following information.

(1) Measurement identity information: This information is a measurement identity associated with a reporting configuration by which a reporting reference is met. A network is able to know that a measurement reporting received from a user equipment is transmitted by a prescribed reference through the measurement identity.

(2) Quality value information of a measured serving cell: This information is a measurement identity of a neighbor cell measured by a user equipment and may include the following contents: 1) a physical cell identity (i.e., a physical cell identity (e.g., PCI for E-UTRAN) of a neighbor cell meeting a reporting reference in general; and 2) a quality value of a neighbor cell (e.g., a quality value (e.g., RSRP, RSRQ, etc.) of a neighbor cell meeting a reporting reference in general).

Contents of a measurement reporting message defined in TS 36.331 v9.4.0 may be represented as Table 3.

TABLE 3

```
MeasResults ::=                    SEQUENCE {
    measId                             MeasId,
    measResultServCell                 SEQUENCE {
        rsrpResult                         RSRP-Range,
        rsrqResult                         RSRQ-Range
    },
    measResultNeighCells               CHOICE {
        measResultListEUTRA                SEQUENCE (SIZE (1..maxCellReport)) OF
            physCellId                         PhysCellId,
```

TABLE 3-continued

| | | |
|---|---|---|
| measResult | SEQUENCE { | |
|     rsrpResult | RSRP-Range | OPTIONAL, |
|     rsrqResult | RSRQ-Range | OPTIONAL, |
|     ..., | | |
| } | | |
| } | | |

Referring to Table 3, the above-described measurement reporting message includes an identity information (measId), a quality value information of a measured serving cell (measResultServcell) and neighbor cell information (measResultNeighCells).

According to the present invention, a user equipment receives a cell list of a cell for at least one frequency from a base station [1]. The user equipment receives a measurement configuration containing a command for restricting measurement evaluation objects to specific cells [2]. And, the user equipment is able to consider the cells as the measurement evaluation objects for the measurement reporting in a measurement evaluating process for the measurement reporting [3].

Figure 14:
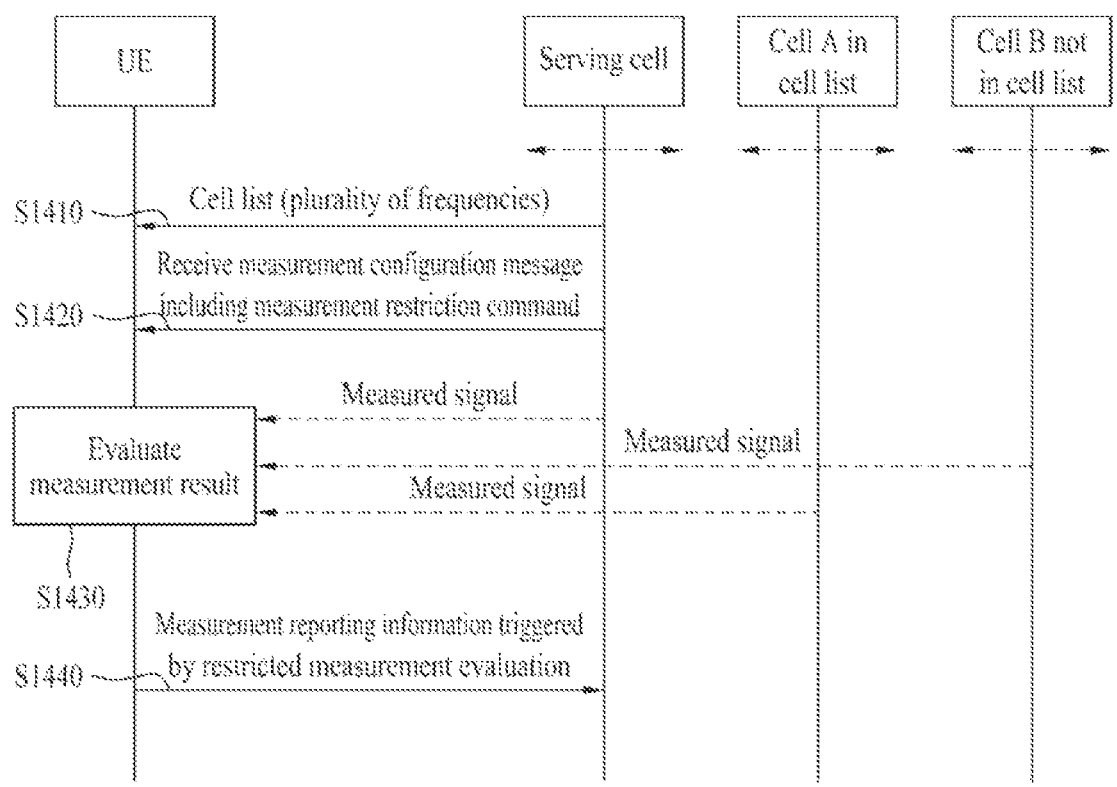
FIG. 14 is a flowchart for exchanging messages between a user equipment and a base station, in which operations of the user equipment are shown.

FIG. 14 is a flowchart for exchanging messages between a user equipment and a base station, in which operations of the user equipment are shown.

Main elements of the present invention are described in detail with reference to FIG. 14 as follows.

First of all, a user equipment receives a cell list from a serving cell base station [S1410].

In this case, the cell list may mean a set of at least one or more cells usable for data transmission between a user equipment and a base station. For instance, in case of a user equipment for which a plurality of serving cells are configurable like a user equipment supportive of carrier aggregation in LTE-A, a primary or secondary serving cell, which is currently configured for the user equipment or addible in the future, may mean the cell list. Moreover, since serving cells may include cells on different frequencies, the cell list may include cells for a plurality of frequencies.

The cell list is constructed with an identity (e.g., a physical cell identity) of each cell and frequency information of the corresponding cell.

The user equipment may be able to receive the cell list by broadcast signaling or signaling per user equipment from the base station.

The user equipment receives a measurement configuration message including a measurement restricting command from the serving cell base station [S1420].

The command for restricting the measurement evaluation objects to specific cells may be received in a manner of being explicitly contained in the measurement configuration message. The configuration of restricting the measurement evaluation objects may be independently configured per frequency measured by the user equipment.

The measurement configuration message including the measurement restricting command may be represented as Table 4.

TABLE 4

| | | | | |
|---|---|---|---|---|
| MeasConfig ::= | SEQUENCE { | | | |
|   -- Measurement objects | | | | |
|   measObjectToRemoveList | | MeasObjectToRemoveList | OPTIONAL, | -- Need ON |
|   measObjectToAddModList | | MeasObjectToAddModList | OPTIONAL, | -- Need ON |
|   -- Reporting configurations | | | | |
|   reportConfigToRemoveList | | ReportConfigToRemoveList | OPTIONAL, | -- Need ON |
|   reportConfigToAddModList | | ReportConfigToAddModList | OPTIONAL, | -- Need ON |
|   -- Measurement identities | | | | |
|   measIdToRemoveList | | MeasIdToRemoveList | OPTIONAL, | -- Need ON |
|   measIdToAddModList | | MeasIdToAddModList | OPTIONAL, | -- Need ON |
|   -- Other parameters | | | | |
|   quantityConfig | | QuantityConfig | OPTIONAL, | -- Need ON |
|   measGapConfig | | MeasGapConfig | OPTIONAL, | -- Need ON |
|   s-Measure | | RSRP-Range | OPTIONAL, | -- Need ON |
|   preRegistrationInfoHRPD | | PreRegistrationInfoHRPD | OPTIONAL, | -- Need OP |
|   speedStatePars | CHOICE { | | | |
|     release | | NULL, | | |
|     setup | | SEQUENCE { | | |
|       mobilityStateParameters | | MobilityStateParameters, | | |
|       timeToTrigger-SF | | SpeedStateScaleFactors | | |
|     } | | | | |
|   } | | | OPTIONAL, | -- Need ON |
|   ... | | | | |
| } | | | | |
| ReportConfigToAddModList ::= | SEQUENCE (SIZE (1..maxReportConfigId)) OF ReportConfigToAddMod | | | |
| ReportConfigToAddMod ::= | SEQUENCE { | | | |
|   reportConfigId | | ReportConfigId, | | |
|   rePortConfig | | CHOICE { | | |
|     reportConfigEUTRA | | ReportConfigEUTRA, | | |
|     reportConfigInterRAT | | ReportConfigInterRAT | | |
|   } | | | | |
| } | | | | |
| -- ASN1STOP | | | | |
| ReportConfigEUTRA ::= | SEQUENCE { | | | |

TABLE 4-continued

```
triggerType                           CHOICE {
    event                             SEQUENCE {
        eventId                       CHOICE {
            eventA1                   SEQUENCE {
                a1-Threshold              ThresholdEUTRA
            },
            eventA2                   SEQUENCE {
                a2-Threshold              ThresholdEUTRA
            },
            eventA3                   SEQUENCE {
                a3-Offset                 INTEGER (-30..30),
                reportOnLeave             BOOLEAN
            },
            eventA4                   SEQUENCE {
                a4-Threshold              ThresholdEUTRA
            },
            eventA5                   SEQUENCE {
                a5-Threshold1             ThresholdEUTRA,
                a5-Threshold2             ThresholdEUTRA
            },
            ...
        },
        hysteresis                    Hysteresis,
        timeToTrigger                 TimeToTrigger
    },
    periodical                        SEQUENCE {
        purpose                           ENUMERATED {
                                              reportStrongestCells, reportCGI }
    }
},
triggerQuantity                       ENUMERATED {rsrp, rsrq},
reportQuantity                        ENUMERATED {sameAsTriggerQuantity, both},
maxReportCells                        INTEGER (1..maxCellReport),
reportInterval                        ReportInterval,
reportAmount                          ENUMERATED {r1, r2, r4, r8, r16, r32, r64, infinity},
...,
[[ si-RequestForH0-r9                 ENUMERATED {setup}   OPTIONAL,    -- Cond reportCGI
   ue-RxTxTimeDiffPeriodical-r9       ENUMERATED {setup}   OPTIONAL     -- Need OR
]]
MeasurementRestriction                ENUMERATED {restrictionEnabled}
}
```

Referring to Table 4, a measurement configuration message includes a measurement object, a reporting configuration information (reporting configuration) and a measurement identity (measurement identities). In this case, various informations are configured for each reporting configuration. For instance, referring to the drawing, information on triggerType, triggerQuantity, reportQuantity and the like are provided for each of reporting configurations. Moreover, according to the present invention, MeasurementRestriction corresponding to a measurement restriction command. Through this, the measurement restriction command may be included in the measurement configuration message.

The command for restricting the measurement evaluation objects to the specific cells may be commanded to the user equipment implicitly through another command in the measurement configuration message received by the user equipment. For instance, as a command A for ordering a specific operation of the user equipment within the measurement configuration message is related to the restriction of the measurement evaluation objects of the present invention, the user equipment receives the command A and may be then able to execute the command A and to perform the operation of restricting the measurement evaluation objects to the specific cells, simultaneously.

Meanwhile, the step S1410 and the step S1420 may be performed using one message (e.g., a measurement configuration message, etc.) only. In particular, the measurement configuration message may include both of the cell message and the measurement restriction command, whereby the cell list receiving step S1410 and the step S1420 of receiving the measurement configuration message including the measurement restriction command may be performed by one step.

The user equipment performs a measurement and then evaluates a result of the measurement based on the measurement result [S1430].

The object of the command for restricting the measurement evaluation objects to the specific cells is to prevent a measurement value of a cell, which is not configurable by the user equipment, from triggering a measurement reporting. Hence, if the user equipment receives the command for restricting the measurement evaluation objects to the specific cells, it may consider the specific cells previously received from the base station as the measurement evaluation objects. For instance, if a user equipment receives a cell list for a specific frequency from a base station and also receives a command for restricting measurement evaluation objects for the specific frequency, the user equipment may consider the measurement evaluation objects as the specific cells of the specific frequency in a measurement evaluating process for determining whether to report a measurement result for the frequency. In particular, after at least one of the specific cells of the specific frequency has been measured, if a measurement value of the measured cell meets a reporting reference for a measurement reporting configuration associated with the frequency, the user equipment transmits a measurement report including the measurement value of the cell meeting the reporting reference to a network.

Meanwhile, in transmitting the measurement reporting information to the network, it is not mandatory for the measurement reporting information to include a measurement value for one frequency only. Optionally, as a cell list in CA applied wireless system includes cells for a plurality of frequencies, a user equipment may transmit one measurement reporting information having measurement values for a plurality of the frequencies to the network.

The user equipment transmits the measurement reporting information to the serving cell base station based on the measurement result evaluation [S1440].

In this case, even if another cell except the cell list of the specific frequency meets the reporting reference of the measurement reporting configuration associated with the frequency, the user equipment does not make a measurement report to the base station. In particular, the user equipment transmits the measurement reporting information measured in response to the measurement restriction command.

According to an embodiment of the present invention, a measurement restriction command of a base station may include a command for restricting a measurement evaluation object to a serving cell configured for a user equipment. In this case, although the base station does not explicitly give a cell list to the user equipment, since it is apparent that the base station already sent a message for configuring a serving cell to the user equipment, it may be included in the scope of the present invention.

Meanwhile, the present invention may be applicable to a case that a plurality of serving cells will be configured for a user equipment for CA configuration. In particular, the present invention may be applicable to restrict a measurement evaluation to cells to be configured as serving cells only.

For instance, a cell list is restricted to a list (e.g., a list of cells across a plurality of frequencies) that may become a serving cell. This cell list may be transmitted to a user equipment. Thereafter, if the user equipment receives a measurement configuration message including a measurement restriction command later, the user equipment may be able to perform a measurement evaluation on the cell list (i.e., the list of the cells across a plurality of the frequencies) in accordance with the measurement restriction command. Therefore, the user equipment may be able to make a measurement reporting of the measurement evaluated cells only.

Figure 15:
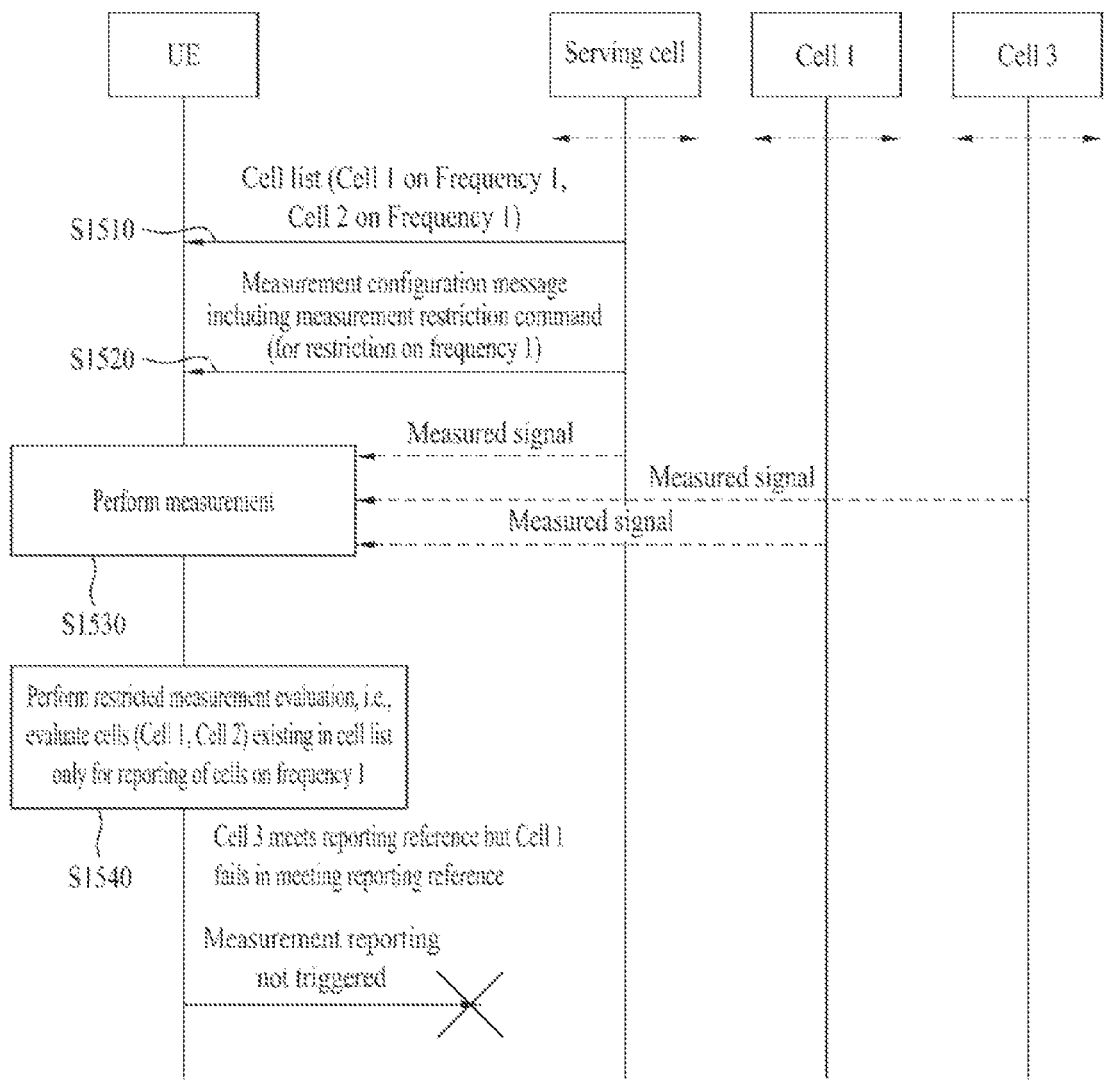
FIG. 15 is a flowchart for an operation of a user equipment in which measurement reporting evaluation objects are restricted to cells in a cell list.

FIG. 15 is a flowchart for an operation of a user equipment in which measurement reporting evaluation objects are restricted to cells in a cell list.

With reference to FIG. 15, an operation of restricting measurement reporting evaluation objects in accordance with a measurement restriction command is described. In the following description, the part overlapping with that shown in FIG. 14 shall be explained.

First of all, a user equipment receives a cell list from a serving cell base station [S1510].

The cell list includes an identity of a cell and a frequency information of the cell (e.g., a plurality of frequency informations included). In the drawing, a cell list for frequency 1 is shown, which is just exemplary. In particular, the cell list may include cell information on other frequencies as well. For instance, the cell list may include a cell list for a plurality of frequencies including frequency 1, frequency 2, frequency 3 and the like. Referring to the drawing, the cell list includes cell 1 and cell 2 as cells for the frequency 1.

The user equipment receives a measurement configuration message including a measurement restriction command from the serving cell base station [S1520].

In this case, the measurement restriction command may include a command for restricting measurement evaluation objects for a measurement reporting. Referring to FIG. 15, the measurement restriction command may include the command for restricting the measurement evaluation objects to the cells corresponding to the frequency 1 only. As mentioned in the foregoing description, the configuration for restricting the measurement evaluation objects may be independently configurable per the frequency measured by the user equipment. In the example related to FIG. 15, the measurement evaluation objects are restricted to the cells corresponding to the frequency 1.

The user equipment measures qualities of the cells [S1530].

In particular, the user equipment measures qualities of a serving cell and a neighbor cell. In the drawing, the user equipment measures qualities of the cell 1, the cell 3 and the serving cell by transmitting and receiving signals.

The user equipment performs measurement evaluation based on a result of the measurement [S1540].

In particular, the user equipment performs the measurement evaluation for a measurement reporting. In doing so, the measurement evaluation objects are restricted to the cells for the frequency 1 in the cell list. Hence, although the measurement of the cells are performed on the cell 1, the cell 3 and the serving cell only, since the cell 3 is not included in the cell list, the cell 3 does not become the measurement evaluation object.

Meanwhile, the user equipment transmits the measurement report of the cells that met the reporting reference included in the measurement configuration information only. Although the cell 1 is the cell included in the cell list by meeting the measurement restriction command, since the cell 1 does not meet the reporting reference, the cell 1 is not included in the measurement evaluation objects. Therefore, the user equipment does not make a measurement reporting.

Figure 16:
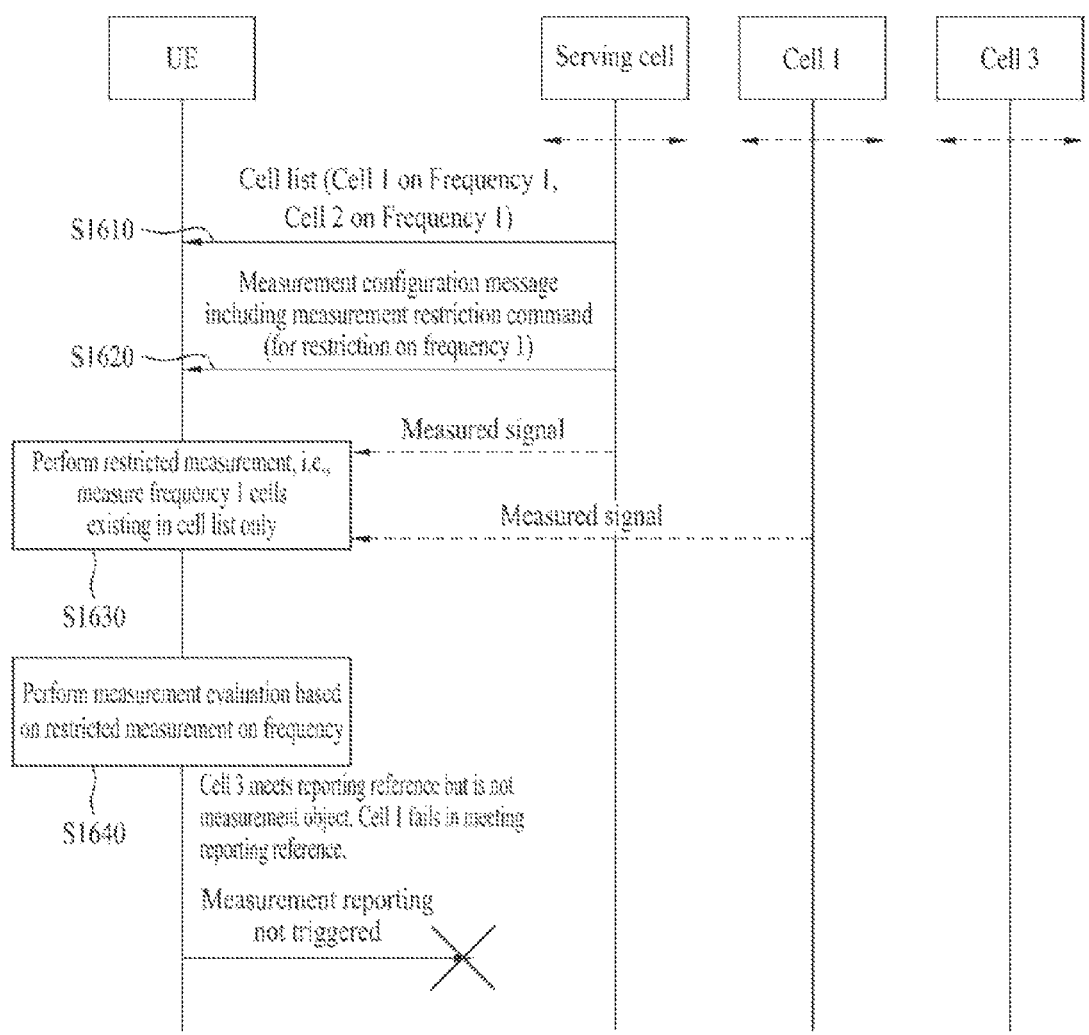
FIG. 16 is a flowchart for an operation of a user equipment in which measured cells are restricted to cells in a cell list.

FIG. 16 is a flowchart for an operation of a user equipment in which measured cells are restricted to cells in a cell list.

First of all, in order to achieve the object of preventing a measurement value of a cell, which is not configurable by a user equipment, from triggering a measurement reporting, if the user equipment receives a command for restricting measurement evaluation objects to specific cells, the user equipment may be able to use a method of restricting the measurement evaluation objects to specific cells previously received from a base station only.

For instance, if a user equipment receives a cell list for a specific frequency from a base station and also receives a command for restricting measurement objects for the specific frequency, the user equipment may be able to restrict the measurement objects to the previously received cell lists. As a result, since a measurement result value of a prescribed cell not included in the cell list of the frequency does not exist, it is unable to meet a measurement reporting reference associated with the frequency. Hence, a measurement result is not triggered by the prescribed cell not included in the cell list of the frequency.

In the following description, a method of restricting measurement objects is explained with reference to FIG. 16.

First of all, a user equipment receives a cell list from a serving cell base station [S1610]. In particular, the cell list includes information on various cells. In the drawing, the cell list includes a cell 1 and a cell 2 as cells for a frequency 1. Meanwhile, as mentioned in the foregoing description, the cell list may be configured with cells for a plurality of frequencies.

The user equipment receives a measurement configuration message including a measurement restriction command from the service cell base station [S1620]. In this case, the measurement restriction command is the command for restricting cells to be measured. For instance, the measurement restriction command is the command for restricting the measurement objects to the cells corresponding to the frequency 1.

The user equipment measures qualities of cells [S1630]. According to the present embodiment, the measurement objects are restricted to the cells included in the cell list. In particular, the user equipment may be able to perform measurement on the cell 1 and cell 2 to which the measurement objects are restricted. Hence, the user equipment does not perform the measurement on the cell 3 that is excluded from the measurement object.

The user equipment performs measurement evaluation based on a result of the measurement [S1640]. In particular, the user equipment performs the measurement evaluation based on the measurement result for the restricted measurement objects. Referring to FIG. 16, the cell 1 meets the measurement restriction command and then becomes the measurement object. Yet, the cell 3 is excluded from the measurement in accordance with the measurement restriction command and does not experience the measurement evaluation. Moreover, although the cell 1 becomes the measurement object, it is unable to meet the measurement reporting reference. In this case, since the cell 1 is unable to meet the reporting reference as well, the user equipment does not make a measurement report. Meanwhile, if the cell 1 meets the reporting reference, the user equipment performs the equality evaluation on the cell 1 and may be then able to send a measurement reporting message including the measurement report based on the performed quality evaluation.

In the following description, a user equipment device and a base station device for performing the aforementioned measurement reporting restricting method according to another embodiment of the present invention are explained.

Figure 17:
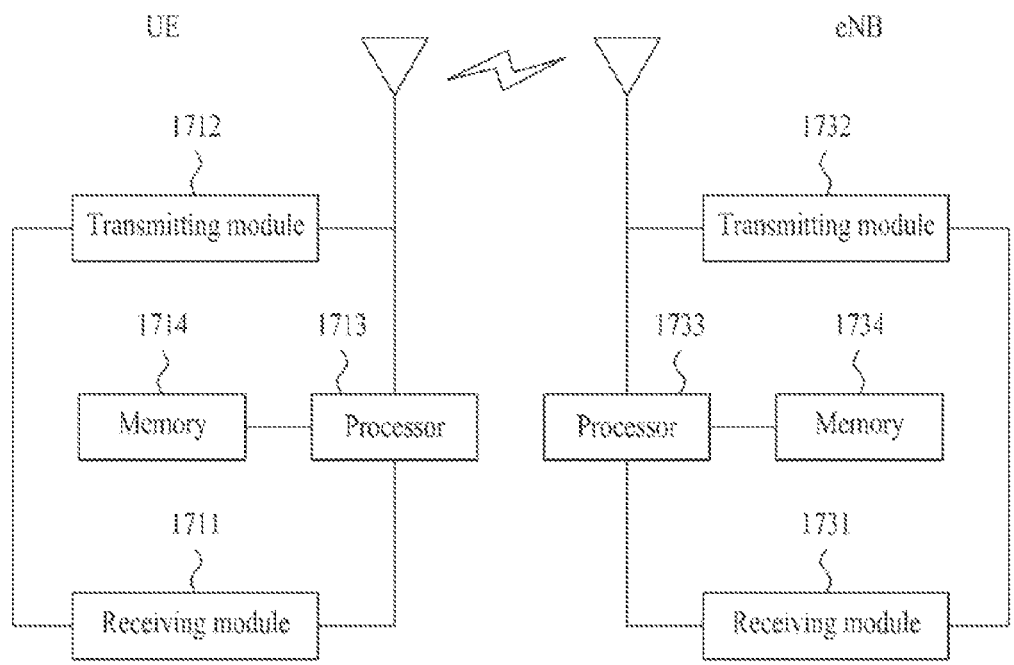
FIG. 17 is a diagram for a configuration of a wireless communication system including a user equipment device and a base station device according to an embodiment of the present invention.

FIG. 17 is a diagram for a configuration of a wireless communication system including a user equipment device and a base station device according to an embodiment of the present invention.

Referring to FIG. 17, a user equipment (UE) device may include a receiving module 1711, a transmitting module 1712, a processor 1713 and a memory 1714. The receiving module 1711 may be able to receive various signals, data, information and the like from a base station and the like. The transmitting module 1712 may be able to transmit various signals, data, information and the like to the base station and the like. The receiving module 1711 may be able to receive the aforementioned measurement configuration information from a network and may be also able to receive a measurement configuration message including the measurement configuration information or a measurement restriction command from the network. The transmitting module 1712 may be able to send a measurement reporting message including measurement reporting message in accordance with a measurement evaluation. The processor 1713 may be able to control a channel quality measurement operation to be performed via the measurement configuration information received via the receiving module 1711. In particular, if the processor 1713 controls a quality of at least one cell, which belongs to a cell list, to be measured and may be able to perform a measurement evaluation to met the measurement restriction command.

Meanwhile, a base station (eNB) device may include a receiving module 1731, a transmitting module 1732, a processor 1733 and a memory 1734. The receiving module 1731 may be able to receive various signals, data, information and the like from a user equipment and the like. The transmitting module 1732 may be able to transmit various signals, data, information and the like to the user equipment and the like.

The processor 1733 may control the transmitting module 1732 to transmit configuration information on a specific one of a plurality of CCs to the user equipment. And, the processor 1733 may be able to manage mobility of the corresponding user equipment via a measurement reporting message received by the receiving module 1731 from the user equipment. The processor 1733 may perform a function of operation processing of information received from the user equipment, information to be externally transmitted and the like. The memory 1734 may be able to store the operation processed information and the like for prescribed duration and may be substituted with such a component as a buffer (not shown in the drawing) and the like.

Meanwhile, a configuration of the processor which becomes a core of each of the configurations of the user equipment and base station is described in detail as follows.

Figure 18:
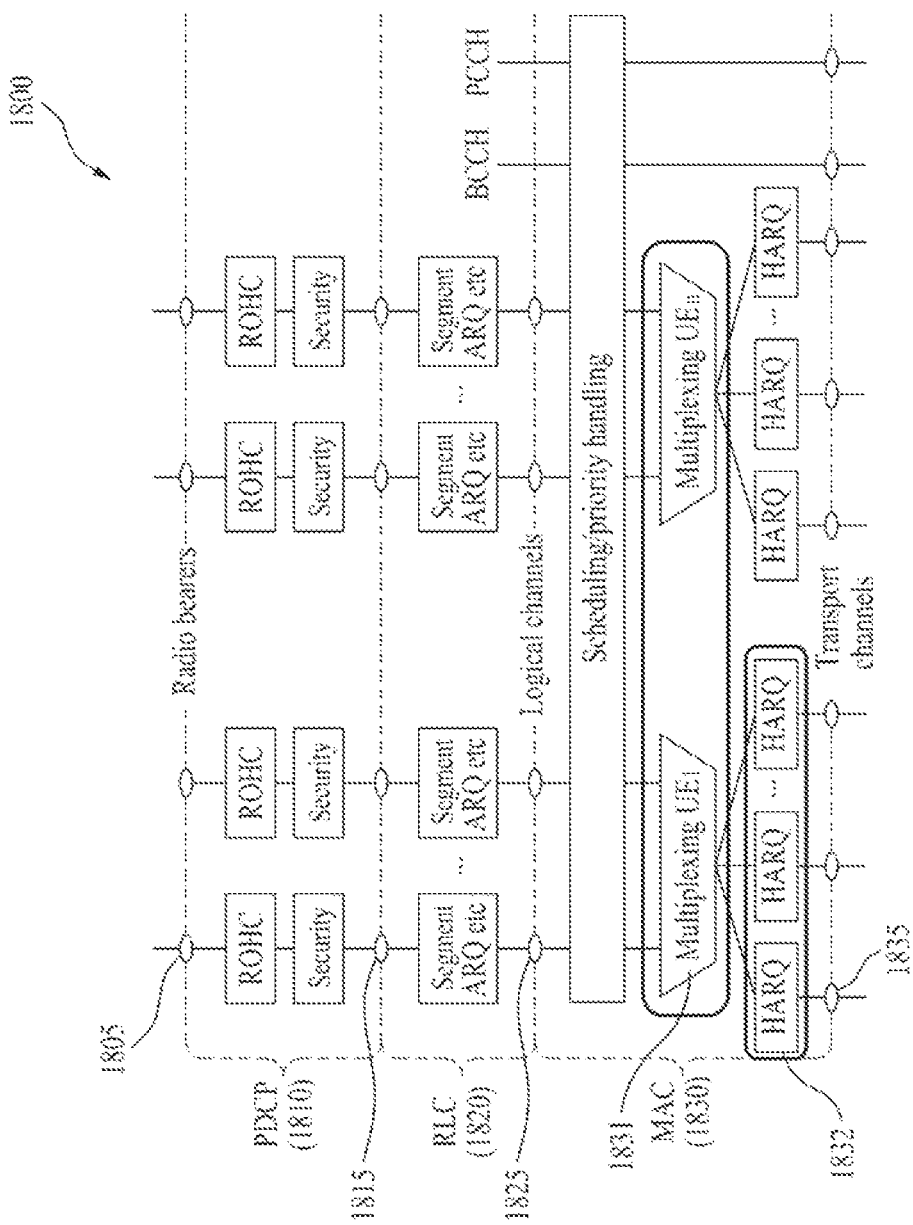
FIG. 18 is a diagram for a processor function of a base station, and more particularly, for a structure of L2 layer ($2^{nd}$ layer) to which embodiments of the present invention are applied.
Figure 19:
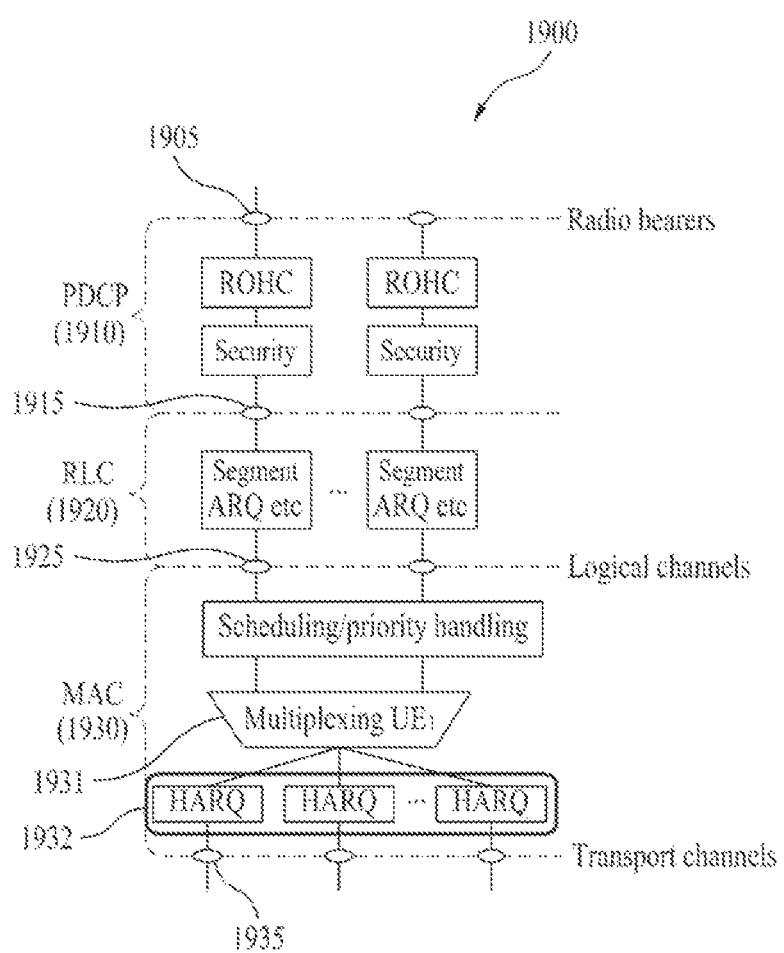
FIG. 19 is a diagram for a processor function of a user equipment, and more particularly, for a structure of L2 layer ($2^{nd}$ layer) to which embodiments of the present invention are applied.

FIG. 18 is a diagram for a processor function of a base station, and more particularly, for a structure of L2 layer ($2^{nd}$ layer) to which embodiments of the present invention are applied, and FIG. 19 is a diagram for a processor function of a user equipment, and more particularly, for a structure of L2 layer ($2^{nd}$ layer) to which embodiments of the present invention are applied.

In a DL L2 structure 1800 shown in FIG. 16, layers of PDCP 1810, RLC 1820 and MAC 1830 are represented. In FIG. 16, elements 18018, 1815, 1825 and 1835 provided to interfaces between the layers indicate service access points (SAP) for peer-to-peer communications. The SAP between PHY channel (not shown in the drawing) and the MAC layer provides a transport channel [1835]. And, the SAP between the MAC layer and the RLC layer provides a logical channel [1825]. General operations of the respective layers are as good as mentioned in the foregoing description.

The MAC layer multiplexes a plurality of logical channels (i.e., radio bearers) from the RLC layer. In the DL L2 structure, a plurality of multiplexing entities 1831 of the MAC layer are related to the application of MIMO (multiple input multiple output) technology. Since one transport channel is generated by multiplexing a plurality of logical channels in case of non-MIMO in a system that does not consider carrier aggregation technology, one HARQ (hybrid automatic repeat and request) entity is provided to one multiplexing entity 1831 [not shown in the drawing].

On the other hand, in a base station processor that considers carrier aggregation technology, a plurality of transport channels corresponding to a plurality of component carriers are generated from one multiplexing entity 1831. Regarding this, in the carrier aggregation (CA) technology, one HARQ entity 1832 manages one component carrier. Hence, the MAC layer 1830 of the base station processor, which supports the carrier aggregation technology, provides one multiplexing entity 1831 with a plurality of HARQ entities 1832 and performs operations related to them. Since each of the HARQ entities 1832 handles a transport block independently, a plurality of transport blocks may be simultaneously transmitted/received via a plurality of component carriers.

The UL L2 structure 1900 shown in FIG. 19 (i.e., the processor L2 structure of the user equipment) performs the same operations of the DL L2 structure 1800 shown in FIG. 18 except that one multiplexing entity 1930 is included in one MAC layer 1930. In particular, a plurality of HARQ entities 1932 are provided for a plurality of component carriers, operations related to a plurality of the HARQ entities 1932 are performed in the MAC layer 1930, and a plurality of transport blocks can be simultaneously transmitted/received via a plurality of the component carriers.

The embodiments of the present invention mentioned in the foregoing description may be implemented using various means. For instance, embodiments of the present invention can be implemented using hardware, firmware, software and/or any combinations thereof.

In the implementation by hardware, a method according to each embodiment of the present invention may be implemented by at least one selected from ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

While the present invention has been described and illustrated herein with reference to the preferred-embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the embodiments of the present invention mentioned in the foregoing description are mainly explained in case of being applied to 3GPP LTE based mobile communication system for clarity, they may be applicable in the same manner to various kinds of mobile communication systems in which a user equipment is able to simultaneously use a plurality of component carriers (CC) using a measurement operation for the mobility management of the user equipment.

What is claimed is:

1. A method of restricting a measurement reporting, which is restricted by a user equipment in a mobile communication system, comprising:
   receiving a cell list including information on a plurality of cells from a serving cell, the cell list including two or more cells which are able to be serving cells when carrier aggregation (CA) is configured for the user equipment;
   receiving a measurement configuration message from the serving cell, the measurement configuration message comprising:
      a plurality of measurement objects,
      a plurality of reporting configurations which includes a reporting condition and a reporting type, and
      a measurement identity to be used for connecting each of the plurality of measurement objects and each of the plurality of the reporting configurations;
   receiving a measurement configuration change message from the serving cell, the measurement configuration change message instructing the user equipment to restrict measurement objects to the two or more cells which are able to be the serving cells when the carrier aggregation (CA) is configured for the user equipment;
   measuring qualities of signals received from the two or more cells in accordance with the measurement configuration message and the measurement configuration change message;
   performing a measurement evaluation to determine whether to make a quality measurement report that is based on the measured qualities of the signals received from the two or more cells; and
   based on the measurement evaluation, transmitting to the serving cell a measurement reporting message including measurement reporting information that is based on the measured qualities of the signals received from the two or more cells.

2. The method of claim 1, wherein the performing a measurement evaluation comprises determining whether the measured qualities of the signals received from the two or more cells meets a reporting reference in the reporting configuration information.

3. The method of claim 1, wherein the cell list comprises a cell identity information of each one of the plurality of cells and a frequency information of the corresponding cell.

4. The method of claim 1, wherein the serving cell is configured for each of a plurality of component carriers.

5. The method of claim 1, wherein the plurality of cells belonging to the cell list comprises a cell used for a data transmission between the user equipment and a base station.

6. The method of claim 1, wherein the cell list and the measurement configuration message are received together.

7. A user equipment comprising:
   a receiver;
   a transmitter; and
   a processor operatively connected to the receiver and the transmitter, the processor configured to:
      receive a cell list including information on a plurality of cells from a serving cell, the cell list including two or more cells which are able to be serving cells when carrier aggregation (CA) is configured for the user equipment;
      receive a measurement configuration message from the serving cell, the measurement configuration message comprising:
         a plurality of measurement objects,
         a plurality of reporting configurations which includes a reporting condition and a reporting type, and
         a measurement identity to be used for connecting each of the plurality of measurement objects and each of the plurality of the reporting configurations;
      receive a measurement configuration change message from the serving cell, the measurement configuration change message instructing the user equipment to restrict measurement objects to the two or more cells which are able to be the serving cells when the carrier aggregation (CA) is configured for the user equipment;
      measure qualities of signals received from the two or more cells in accordance with the measurement configuration message and the measurement configuration change message;
      determine whether to make a quality measurement report that is based on the measured qualities of the signals received from the two or more cells; and
      based on the measurement evaluation, transmit to the serving cell a measurement reporting message including measurement reporting information that is based on the measured qualities of the signals received from the two or more cells.

8. The user equipment of claim 7, wherein the serving cell is configured for each of a plurality of component carriers.

9. The user equipment of claim 7, wherein the performing a measurement evaluation comprises determining whether the measured qualities of the signals received from the two or more cells meets a reporting reference in the reporting configuration information.

10. The user equipment of claim 7, wherein the cell list comprises a cell identity information of each one of the plurality of cells and a frequency information of the corresponding cell.

11. The user equipment of claim 7, wherein the plurality of cells belonging to the cell list comprises a cell used for a data transmission between the user equipment and a base station.

12. The user equipment of claim 7, wherein the cell list and the measurement configuration message are received together.

* * * * *